United States Patent [19]

Paton et al.

[11] 4,358,096

[45] Nov. 9, 1982

[54] VEHICLE SUSPENSION SYSTEM

[76] Inventors: H. Neil Paton, 2521 West Montlake Place East; John B. Skilling, 539 McGilvra Blvd. East, both of Seattle, Wash. 98112; Jeffrey P. Sandys, 138 N. 78th St.; E. Frederick Gylland, Jr., 6517 Fremont Ave. North, both of Seattle, Wash. 98103

[21] Appl. No.: 242,511

[22] Filed: Mar. 10, 1981

Related U.S. Application Data

[63] Continuation of Ser. No. 16,533, Mar. 11, 1979, abandoned.

[51] Int. Cl.³ .................................................. F16F 3/00
[52] U.S. Cl. ..................................... 267/9 C; 188/129
[58] Field of Search ...................... 188/129, 381, 382; 267/98, 9 C, 48, 49, 63 R, 121, 151

[56] References Cited

U.S. PATENT DOCUMENTS

| 769,841 | 9/1904 | Shepard | 267/9 B X |
|---|---|---|---|
| 2,497,829 | 2/1950 | Baselt | 267/9 C |
| 2,752,149 | 6/1956 | Forcellini | 267/9 C |
| 3,713,516 | 1/1973 | Freyler | 267/9 B X |
| 4,010,940 | 3/1977 | Freyler | 267/9 B |

Primary Examiner—Duane A. Reger

Attorney, Agent, or Firm—Dowrey & Cross

[57] ABSTRACT

A spring and damper suspension system which comprises one or more elastomeric spring elements in compressive load bearing relation to the members to be supported. A tubular housing surrounds said spring elements and supports a frictional surface or surfaces in its interior. Stabilization of the springs is achieved by mounting pairs of slidably engaged wedges between said springs. Compressive force on said wedges urges one face of each such wedge into sliding contact with the interior walls of the housing and maintains the upper and lower surface of the wedge pair, and hence the springs in proper alignment to the housing. For applications involving vehicle suspension, the tubular housing may be combined in telescoping relation with a second tubular housing for the purpose of resisting bending moments normally applied to the suspension of such vehicles. Frictional damping apparatus associated with said springs maintain pads of frictional material with said frictional surfaces and press them against said surfaces with a force which varies according to the load being applied to the springs. Relative motion of the supported members causes said frictional pads to slide along said frictional surface resulting in the generation of frictional damping forces.

16 Claims, 8 Drawing Figures

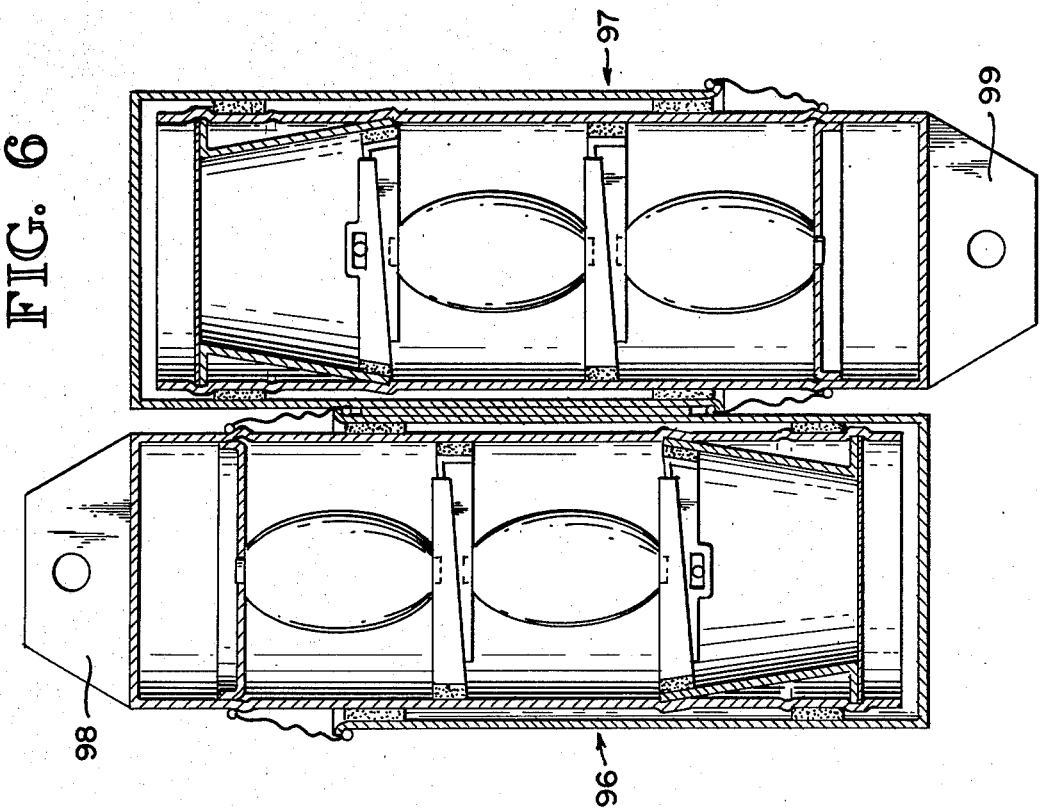
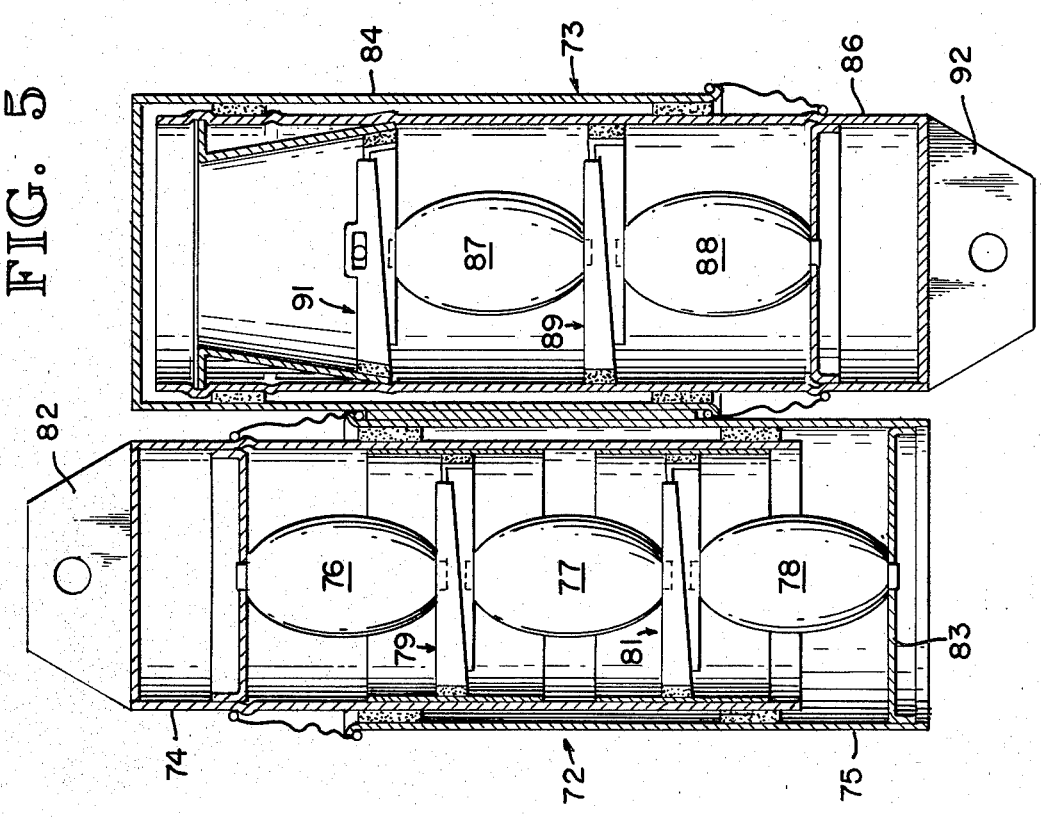

VEHICLE SUSPENSION SYSTEM

This is a continuation of application Ser. No. 016,533, filed Mar. 11, 1979, now abandoned.

BACKGROUND OF THE INVENTION

This invention relates to vehicle suspension systems of primary utility in rubber tired vehicles. More particularly, the present invention relates to suspension systems of the type described which utilize a plurality of spring members of the solid elastomeric mass type which are contained and stabilized within a housing or envelope so as to act in series to provide the spring suspension. In addition to the spring action, frictioned damper means are provided which act in conjunction with the spring members, spring stabilizing units and the envelope or housing to dampen the spring action. Although the invention is herein illustrated and described with reference to specific suspension systems, the invention is not limited to these suspension systems and may be utilized in other vehicle suspension applications and environments.

Although prior art rubber tired vehicles, both cargo carriers and pleasure vehicles, have utilized dampened spring suspension systems, most such systems have involved either mechanical coil spring units, pneumatic or hydraulic units or a combination thereof with the attendant problems of rapid wear, excess weight, and a limited utility over a wide range of load and frequency conditions. The use of generally circular cross section so-called "rod springs" composed of elastomeric material, such as shown in U.S. Pat. No. 3,984,125 is also well known in the art. Certain of these systems in addition illustrate frictional damper spring elements. Railcar suspension systems such as those disclosed in U.S. Pat. Nos. 3,961,582 and 3,961,584 are also exemplary of the so-called rod spring suspension systems.

A primary object of the present invention therefore is to provide an improved vehicle suspension system which includes a plurality of individual spring members with frictional damping means associated therewith.

Another object of the present invention is to provide an elastomeric spring and frictional damper suspension system which, for given load and frequency conditions, is lighter in weight than conventional suspension systems of any type heretofore known.

Another object of the invention is to provide an elastomeric spring suspension system of the type described which provides a smoother ride for lightweight vehicles of modern design.

A still further object of the present invention is to provide a spring suspension system of a character described which has an extended wear life and which is only insignificantly effected by normal mechanical wear.

A further object of the present invention is to provide a novel envelope or housing for mounting a series of individual spring units, which envelope cooperates with stabilizer units, the individual springs and with a damper means for dampening the spring action.

A still further object of the present invention is to provide an envelope or housing for a spring suspension system of the character described which withstands lateral bending and which can be constructed in a compact fashion so as to meet highly restricted space and weight limitations for modern lightweight vehicles.

SUMMARY OF THE INVENTION

The present invention provides in its broadest form a suspension system for vehicles or stationary equipment which comprises one or more spring elements located between the body to be supported and a spring support in combination with one or more pairs of wedge type force transmitting friction dampers. The spring element or elements are located within a tubular housing which provides friction engagement surfaces for the wedge type dampers. The wedge dampers are maintained in constant contact with the housing by a lateral component of the load bearing force applied to the spring element and transmitted to the spring support by the friction dampers. In this manner a constant damping action is obtained when the spring suspension system is in load transmitting relation. With this arrangement, the wedge type force transmitting friction dampers act in conjunction with the tubular housing to stabilize the spring member or members when subjected to a loading force.

In the preferred embodiment, the force transmitting wedge members are interfaced with a low coefficient of friction material or surfaces which permit the wedges to be slidably interconnected so as to transmit both compression and tension forces so as to be held in constant contact with the opposed friction wear surfaces of the tubular housing. With this arrangement, a plurality of spring elements may be located within the tubular housing to act in series in combination with pairs of wedge type force transmitting stabilizers and/or friction dampers. In the preferred embodiment, the wear surface portions of the tubular housing which cooperates with the friction damper wedges are tapered so as to increase or decrease the damping effect on the spring during operation as desired.

For applications involving vehicle suspension, the tubular element is combined in telescoping relation with a second tubular element for the purpose of resisting bending moments normally applied to the spring suspension of such vehicles. In this application, one of the telescoping tubular members is clamped or rigidly attached to the wheel or axle support structure with the other tubular member being arranged to receive the load from the chassis in a more or less conventional manner. The spring or column of springs and damper system within the second tubular member is then arranged to seat or bear on a suitable connection with the fixed outer tubular member. This arrangement not only provides for stabilization of the spring or spring members within the tubular housing along with the friction damper action, but also successfully withstands any bending moments applied to the spring suspension system during operation.

The above-described arrangement of telescoping tubular housing mounting for the spring, stabilizers and wedge type friction dampers renders feasible the use of a plurality of spring elements which are preferably of the solid elastomeric mass type but which may also be of the coil compression spring type or a combination of the two. With the use of multiple spring elements, the stabilizers and the wedge members within the tubular housing prevent rolling or disalignment of the spring elements and the telescoping tubular members resist bending moments. In order to obtain the desired spring support involving the use of a number of spring elements in instances such as passenger vehicles wherein severe space limitations are operative, two or more telescoping tubular units may be combined in parallel to obtain the effect of the damped spring support of a number of individual spring elements in series. With this arrangement, a larger number of spring elements may be mounted, stabilized and damped while still obtaining the advantages of lightweight construction, space conservation and the advantage of negligible effect of wear on overall spring efficiency.

According to one preferred embodiment of the invention, the spring element is constituted by an ellipsoid solid of revolution or a modified prolate ellipsoid having a solid body of elastomeric material, preferably natural rubber.

These and other features, objects and advantages of the present invention will become apparent from the detailed description of the claims to follow taken in conjunction with the accompanying drawings in which like parts bear like reference numerals.

BRIEF DESCRIPTION OF THE DRAWINGS

FIG. 5 is a cross-sectional view of a parallel tubular housing arrangement;

FIG. 6 is a cross-sectional view similar to FIG. 5 illustrating a second embodiment of spring and damper arrangement for a parallel tubular housing;

DETAILED DESCRIPTION OF THE DRAWINGS

Figures 1, 2:
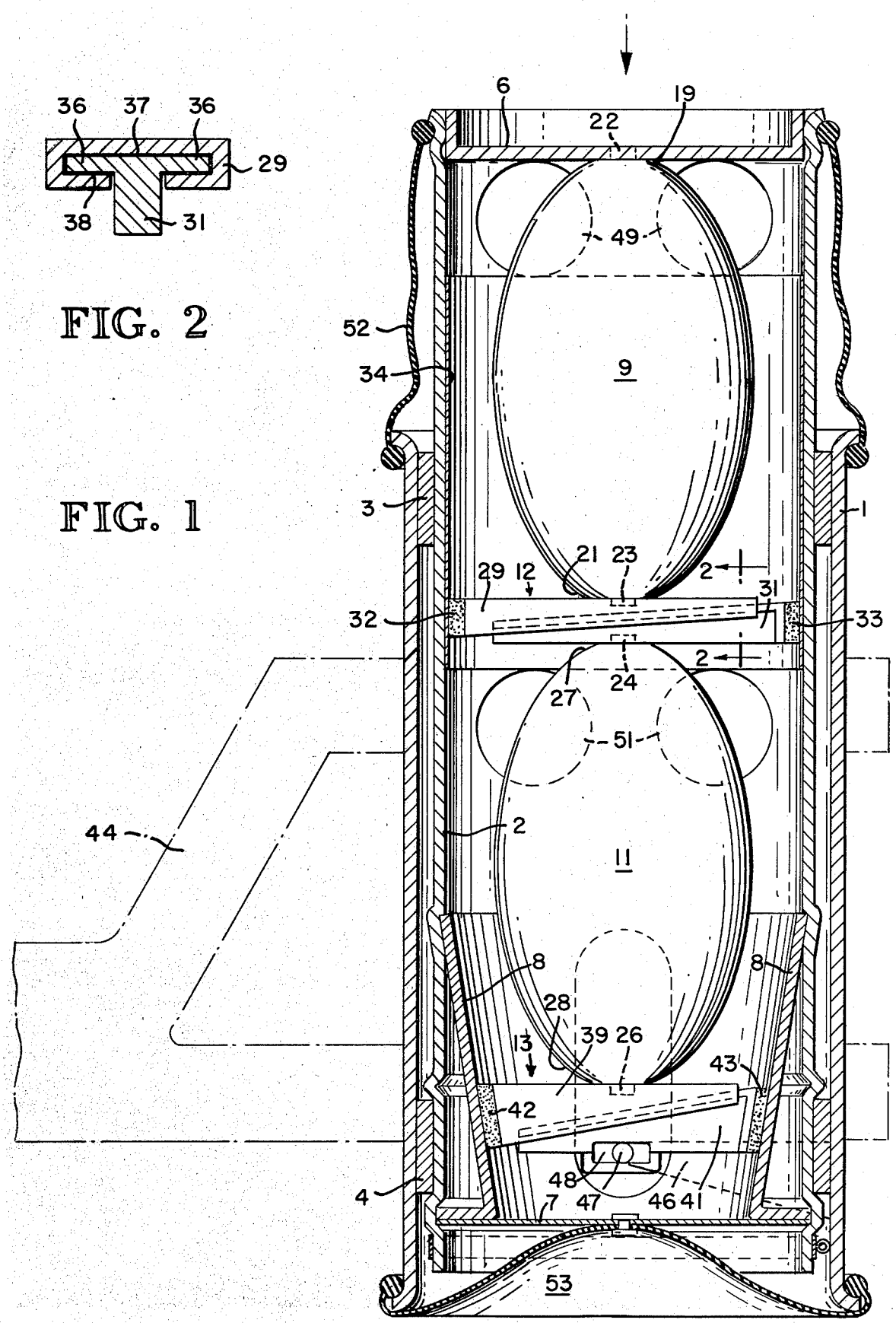
FIG. 1 is vertical cross-sectional view of a typical spring suspension unit with the means of attachment to a vehicle axle and chassis shown schematically.
FIG. 2 is a cross-sectional view taken along line 2—2 of FIG. 1 showing details of the wedge type damper.

Referring first to FIGS. 1 and 2 of the drawings, a spring and damper suspension system according to the present invention is illustrated which is capable of being used in an application where resistance to bending motions is desired. Although the embodiment of the invention is illustrated schematically as applied to a vehicular suspension system, it will be well appreciated by those skilled in the art that this embodiment could also be applied to a suspension system for stationary equipment as well.

As illustrated in FIGS. 1 and 2, the present system comprises an outer tubular housing 1 which surrounds inner housing 2 in telescoping relation. Bands of bearing material or solid lubricant 3 and 4 separate the tubular housings 1 and 2 and maintain them in coaxial alignment while allowing them to slide longitudinally with respect to one another. Many forms of solid anti-friction or lubricant product are commercially available and will suffice and should be chosen for the desired wearing qualities and ability to withstand the anticipated pressures between the telescoping tubes. The upper and lower ends of housing 2 are closed off by end plates 6 and 7 respectively so as to confine the spring and wedge damper assembly within the inner tubular housing. The tubular housing members 1 and 2 may be fabricated from any desired cross-section and may be formed such as by extrusion or casting from any strong lightweight material such as aluminum, magnesium, or synthetic resin material reinforced by fibers such as graphite, carbon, glass or equivalent. The lower portion of inner housing 2 is provided with opposed converging inclined friction wear surfaces or ramps 8 which, in the case of circular cross-section housings, may be frustroconical or may be two separate opposed arcuate sections. Regardless of the cross sectional configuration the ramp members will be located and mounted by any known suitable means so as to cooperate with the wedge dampers as will presently be described. The friction wear faces of the ramps 8 are inclined at a constant angle to provide a variable rate frictional damping force as the frictional shoe of the damper wedges move relative to the wear faces. The angle of inclination may be varied according to the damping characteristics desired.

The embodiment illustrated in FIGS. 1 and 2 comprises a dampened and stabilized multiple spring system which includes the two elastomeric spring elements 9 and 11, the wedge stabilizer assembly indicated generally at 12, and the wedge frictional damper assembly indicated generally at 13. As aforementioned, the spring elements may be either conventional coil springs or solid elastomeric springs with the latter being preferred for most applications. Although an ellipsoid solid of revolution or a modified prolate ellipsoid "rod spring" is preferred, other configurations may be used depending on the configuration of the tubular housing members and the spring characteristics desired. The FIG. 1 embodiment, which is preferred for most practical applications, shows an ellipsoid having a diameter ratio of approximately 2:1. The durometer of the elastomeric material should be about 40° to 70° International Rubber Hardness Degrees (IRHD) with the preferred durometer being approximately 50°.

Figure 7:
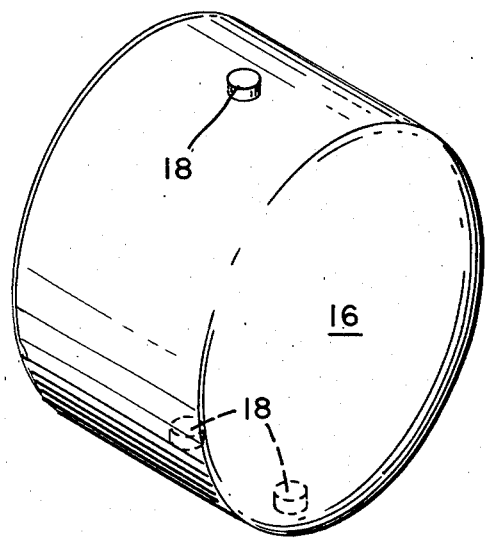
FIG. 7 is a perspective view of a rod spring of the prolate elliptical type.
Figure 8:
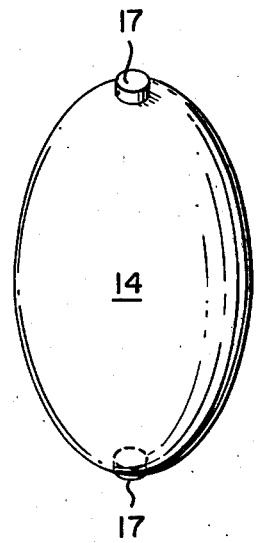
FIG. 8 is a perspective view of an ellipsoid or elliptical solid of revolution type elastomeric spring according to this invention.

FIGS. 7 and 8 illustrate typical ellipsoid and prolate or elongated ellipsoid springs suitable for the present invention. The ellipsoid spring 14 of FIG. 8 and the modified prolate ellipsoid spring 16 of FIG. 7 demonstrate essentially the same characteristics except that by lengthening the rod spring 16 a higher load bearing capacity is obtained, although the spring frequency is increased somewhat. The ellipse ratio of the FIGS. 7 and 8 springs and the length selected for the FIG. 7 spring in any instance will depend upon desired suspension frequency, operational load range, weight and service life. In general, the higher the ellipse ratio, the lower the frequency obtained for a given load. By utilizing a higher durometer elastomeric material, a higher suspension frequency is obtained; however, the effects of hysterisis tend to be pronounced for higher durometer elastomeric materials and therefore a greater tendency to heat up after repeated load cycles is present thus tending to correspondingly decrease service life. As mentioned above, increased length permits higher loads but results in increased frequency. In any event the springs of FIGS. 7 and 8 will have convexly curved upper and lower load bearing surfaces which allow the adjacent side walls to roll down gradually during compression loading with resultant lowering of stresses in the material and consequent increased service life. The curved load bearing surfaces further maintain stability during increased deflection and therefore permit higher ellipse ratios (major/minor axis) to be used. The upstanding bosses 17 and 18 located on the load bearing surfaces of the springs 14 and 16 respectively are of appropriate outlines that can register and engage with appropriate recesses in the load force applying members. This engagement serves to locate the springs and prevent or substantially minimize the tendency to shift or rotate under compressive loads.

Referring again to the FIG. 1 embodiment, the elastomeric ellipsoid spring 9 has an upper load bearing surface 19 and a lower load bearing surface 21 with associated locating bosses 22 and 23 respectively. The upper boss 22 engages the end plate 6 and the load bearing surface 19 is positioned to be compressively loaded against the end plate. The boss 23 is located in an appropriate recess in the upper wedge member of the stabilizing assembly 12 with the load bearing surface 21 in position to transmit a vertical loading force to the stabilizer. Likewise the spring 11 has upper and lower bosses 24 and 26 positioning its upper and lower load bearing surfaces 27 and 28 for force transmitting contact with the lower wedge of the stabilizer assembly and the upper wedge of the friction damper assembly 13.

The stabilizer assembly 12 comprises an upper wedge shaped member 29 and a lower wedge member 31. The wedge members are provided with pads or shoes 32 and 33 respectively composed of a low coefficient of friction material or solid lubricant for engaging a wear surface 34. The surface 34 may be in the form of a steel strip or the like bonded to the housing 2 to cooperate with the shoes 32-33.

FIG. 2 illustrates the interconnecting relationship between the wedges 29 and 31 which provides for the transmission of both tension and compression forces. To this end, the wedge 31 is generally "T" shaped in cross section with the flanges 36 being received in the channel provided by the generally "C" shaped cross section of the wedge 29. The force transmitting inclined contact surfaces of the wedges 29 and 31 are provided with a coating of low coefficient of friction lubricant material 37 and 38 to permit free sliding motion between the wedges when subjected to compression loading transmitted by the springs 9 and 11. This sliding action results in a force component normal to the compressive loading force which maintains the shoes 32-33 in engagement with the walls of the housing 2 for the purpose of stabilizing the springs 9 and 11 within the housing.

The friction damper assembly 13 includes the upper and lower wedge members 39 and 41 respectively equipped with friction pads or shoes 42 and 43. It will be understood that the shoes 39-41 are of similar cross-section and interfitting relation as the shoes 29-31 shown in FIG. 2 so as to be capable of transmitting both compressive and tension forces. Likewise the wedges 39-41 have low coefficient of friction lubricant material coatings to provide for lateral relative sliding motion as a result of compressive loading of the springs. The friction damper pads 42 and 43 are in this manner forced against the ramps 8 to obtain the friction damping under variable spring loading.

In the case of vehicle application as illustrated in FIG. 1, the outer housing member 1 may be fixedly attached to axle structure 44 with the housing 1 being in turn connected to transmit loading forces to the inner housing member 2 via the cantilevered force transmitting arm 46, and thus the outer housing 1 and arm 46 serve as a spring support means. The arm 46 is fixedly mounted on the inner wall of housing 1 and may extend through an appropriate slot or the like in the housing 2 to engage the wedge 41 by means of a pin or the like 47 extending through a slot 48. This arrangement permits lateral movement of the wedge 41 during friction damping motion. The compressive load from the vehicle chassis may be applied through any suitable connection (not shown) to the upper end plate 6 of the housing 2 in the direction indicated by the arrow in FIG. 1.

To complete the structure of the suspension system, the inner tubular housing 2 is provided with groups of openings 49 and 51 which permit free passage of air about the springs 9 and 11. In order to protect the system and primarily the lubricated working surfaces from dust and other foreign matter a flexible sleeve 52 is sealed between the upper ends of the housings 1 and 2 and a second flexible sleeve 53 is connected in sealing relation between the bottom ends of the tubular housings. The dust sleeves may be connected and sealed to the housings in any known manner. Since the relatively free flow of air about the springs and friction damper assembly is desired for cooling effects, the material of the dust sleeves is preferably porous and waterproof such as silicone treated durable fabric.

When compressive forces are exerted between end plate 6 and bracket 46, the forces are resolved by the wedge members 39, 41 into a first component which causes housing 2 to slide within housing 1 compressing the springs 9 and 11 therebetween. The lateral or second component of the compressive force presses the friction pads of wedges 39 and 41 against the ramps 8. Similarly the force applied to wedges 29 and 31 maintain the low coefficient of friction pads 32 and 33 in contact with the wear surface 34 of the housing to stabilize the springs with the housing. Variable rate frictional damping is achieved as the friction pads 42-43 move upwardly and downwardly along the inclined ramps 8 in response to varying spring loading. The angle of incline of the ramps 8 may, of course, be varied in order to vary the damping rate.

Although the foregoing description relative to FIGS. 1 and 2 contemplates the use of telescoping tubular housing elements, such structure is necessary only in applications wherein bending moments are a problem. As previously mentioned, the invention in its broader form contemplates the use of a single housing or tubular member for constraining the spring element or elements and for providing surfaces which cooperate with the stabilizer and/or friction damper assemblies. Thus for the single housing application, referring to FIG. 1, only the inner tubular member 2 would be utilized with the compressive loading force being applied directly to the end plate 6 and the spring support for the compressive load being applied directly to the bottom wedge member 41. In all other aspects the operation of the spring means, stabilizer assembly, friction damper assembly and cooperating housing would be identical to that described for FIG. 1. It will, of course, be understood by those skilled in the art that the number of spring elements and associated stabilizers and friction damper assemblies could be increased as desired without departure from the present invention, depending on the character of the spring suspension desired as taught herein.

Figure 3:
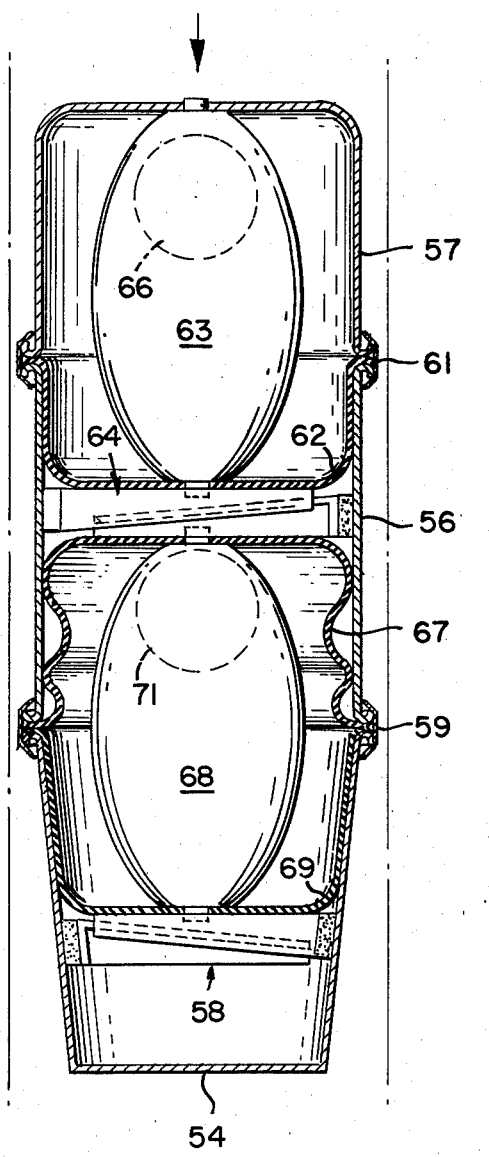
FIG. 3 shows an alternate embodiment of tubular housing structure and sealing arrangement for the inner tubular member of the arrangement shown in FIG. 1.

FIG. 3 illustrates an alternate end construction and sealing means for the inner tubular housing of the suspension system described in reference to FIG. 1. In this embodiment, the inner tubular housing is made up of a lower section 54, a cylindrical mid section 56, and an upper section 57. The lower section 54 has inclined side walls for cooperation with the friction damper assembly 58 as described with reference to the FIG. 1 embodiment. The housing sections include rolled edges which are held together by annular clamp rings 59 and 61 in a well known manner. It will be understood that any suitable arrangement may be utilized to connect the bottom wedge of the friction damper assembly to a spring support means. In this construction, the upper section 57 is a simplified single walled end closure for the housing and, when connected to the remaining sections 54 and 56 by the ring clamps effectively confines the springs, stabilizer assembly and friction damper assembly within the inner housing. The dust seal is simplified in this embodiment by locating the flexible seal 62 between the bottom load bearing surface of the upper spring 63 and the stabilizer assembly 64 and clamping the free edge of the sealing material between the sections 56 and 57. The holes 66 permit cooling air to circulate about the spring 63. A second seal 67 is located between the upper load bearing surface of the spring 68 and the stabilizer assembly protecting it against dust and foreign matter. A third seal 69 is located between the lower force bearing surface of the spring 68 and the damper assembly 58 for its protection with the free ends of the seals 67 and 69 being clamped between the mating edges of the housing sections 54 and 56. Holes 71 in the section 56 permit free flow of cooling air about the spring 68.

Figure 4:
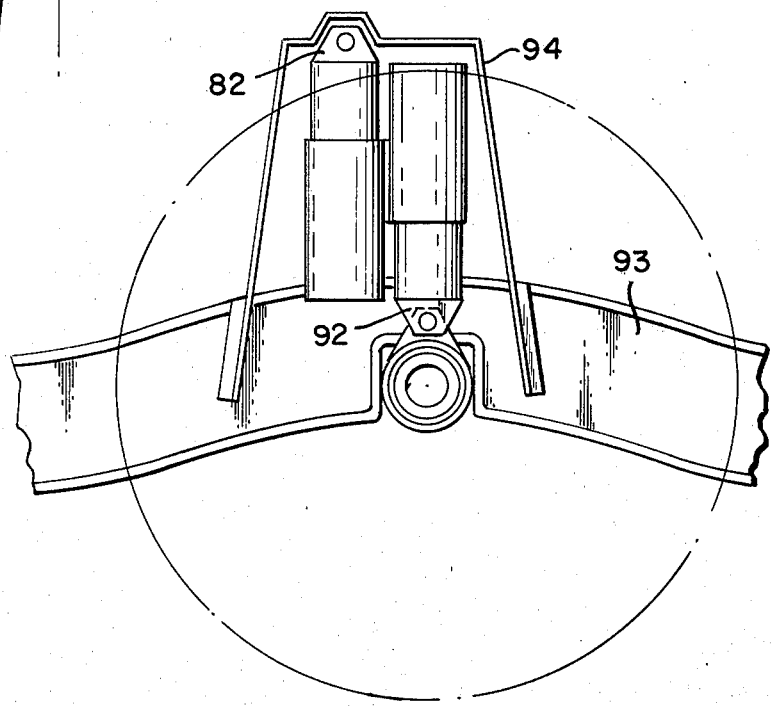
FIG. 4 is a perspective view of an arrangement of parallel spring suspension units as applied to the front wheel suspension of a vehicle.

FIGS. 5 and 6 illustrate alternate embodiments of the spring suspension system of the present invention, wherein two or more telescoping suspension units containing one or more springs, dampers and stabilizers may be placed in parallel to form a single acting suspension system. FIG. 4 is a schematic illustration of the manner in which such parallel units are mounted to a motor vehicle wheel frame and chassis.

Referring first to FIG. 5, a first telescoping unit indicated generally at 72 is axially aligned with and fixedly connected to a second telescoping unit 73. In this embodiment, the telescoping unit 72 comprises an outer housing 75, and inner housing 74 which confines a series of three elastomeric springs 76, 77, 78 with intervening stabilizing assemblies 79 and 81 acting therebetween in a manner described with relation to FIG. 1. The compressive load is applied to the springs through the connector 82 carried by the upper end of the inner housing 74 and the bottom spring seats against the end closure 83 of the outer housing. The unit 73 includes the outer housing 84 and the inner housing 86 containing the two springs 87 and 88, the intermediate stabilizer 89 and the friction damper assembly 91. The friction damper and stabilizer assemblies will be understood to operate in the manner described relative to FIG. 1. The spring support is applied to the connector 92 carried by the housing 86 which is pin and slot connected to the outer housing 84 in a manner previously described. The outer housings 75 and 84 are fixedly connected by any well known means such as welding or the like.

With this arrangement it will be apparant that two or more units of serially acting springs may be placed in parallel in bending moment resisting housings in order to reduce space requirements making it possible for the first time to effectively utilize multiple elastomeric springs or coil springs in light weight restricted space environments. FIG. 4 illustrates the use of such parallel units according to FIG. 5 in motor vehicle suspension applications such as modern light weight compact automobiles. In this illustration, the connector 82 is connected to receive compressive loads from the chassis 93 via frame 94 with spring support being provided through the connection of the connector 92 to the axle structure.

FIG. 6 shows an alternate construction for parallel telescoping units of the type shown in FIG. 5 wherein each of the units 96 and 97 include friction damper assemblies with compressive loading being transferred from the damper assembly to the related outer tubular housing. The outer tubular housings are then fixedly connected thus transferring the spring loading from the connector 98 to the connector 99.

While several preferred embodiments of the invention have been illustrated and described herein, variations will become apparent to one of ordinary skill in the art. For instance any known form of antifriction roller or ball members could be adapted to be substituted for the low coefficient slidable surfaces between the wedge members of the damper assemblies and stabilizer assemblies. Likewise, various equivalent materials of construction could be adapted for use in the invention. Accordingly, the invention is not to be limited to the specific embodiments illustrated and described herein, and the true scope and spirit of the invention are to be determined by reference to the appended claims.

We claim:

1. A spring suspension system comprising:
load bearing spring means;
means for retaining said spring means and receiving compressive loads therefrom;
spring support means for receiving compressive loads to be applied to said system; and
force responsive frictional damping means acting between said spring means and said spring support means for damping compressive and expansive movement of the spring means, said damping means being operatively associated with said spring retaining means for receiving compressive loads from said support means and applying a first component of load bearing force therefrom to said spring means and a second force component thereof for forcing said damping means into damping engagement with said retaining means.

2. The spring suspension system according to claim 1 wherein said frictional damping means includes frictional damping elements and means to move said elements into frictional damping engagement with at least one wear surface on said retaining means responsive to said second force component.

3. The spring suspension system according to claim 2 wherein said means to move said damping elements comprises first and second wedge members having mating inclined sliding surfaces with a low coefficient of friction, said damping elements being mounted on said wedge members respectively and positioned in normal contact with at least one associated wear surface on said retaining means whereby said second force component is reacted through said wedge members to force said frictional damping elements into damping contact with said retaining means.

4. The spring suspension system according to claim 3, wherein said first and second wedge members include mating inclined sliding surfaces which are slidably interlocked to maintain said sliding surfaces in sliding contact with one another.

5. The spring suspension system according to claim 1 wherein said spring means includes a multiplicity of spring elements in coaxial alignment with one another.

6. The spring suspension system according to claim 5 wherein said spring elements are maintained in relative coaxial alignment by spring stabilizing means mounted between each such spring element and the adjacent spring element and wherein said spring stabilizing means is maintained in sliding contact with said retaining means.

7. The spring suspension system according to claim 1, wherein said retaining means include a tapered section for damping engagement with said damping means whereby the damping force generated by said damping means may be controlled.

8. The spring suspension according to claim 1, wherein said retaining means is telescopically engaged in relation to said spring support means for providing resistance to bending moments created along the axis of said spring suspension system.

9. The spring suspension system according to claim 8 wherein said retaining means is fixedly connected to and in parallel relation with a second spring suspension system.

10. The spring suspension system according to claim 9, wherein said second spring suspension system comprises second load bearing spring means, second retaining means attached to said first retaining means for retaining said second spring means and receiving compressive loads therefrom and a second spring support means for receiving compressive loads to be applied to said system.

11. The spring suspension system of claim 10, wherein said second spring suspension means further comprises a second force responsive frictional damping means located between said second spring means and said second support means, said second damping means being operatively associated with said second retaining means for receiving compressive loads from said second support means and applying a first component thereof to said second spring means and a second force component thereof for forcing said second damping means into damping engagement with said second retaining means.

12. The spring suspension system according to claim 1 or 8 wherein said retaining means is mounted to the frame of a vehicle and said spring support means is mounted to one axle of said vehicle adjacent the end of said axle for providing damped spring suspension between said frame and said axle.

13. The spring suspension system according to claim 1, wherein said load bearing spring means comprises a spring of elastomeric material.

14. A suspension system comprising:
first and second telescoping members slidably connected for relative axial movement, said second telescoping member including a frictional damping surface;
spring means operatively associated with said telescoping members for resisting movement therebetween in one direction;
means for transmitting compressive forces from the second telescoping member to the spring means;
a wedge member movably connected to said first telescoping member for receiving compressive forces therefrom, said wedge member including frictional damping means associated therewith and slidably engaged with said frictional damping surface for applying a first component of said compressive forces to frictionally dampen relative movement of the telescoping members; and
an inclined member in force transmitting relation with said spring means and movably engaged with the wedge member for transmitting a second component of said compressive forces from the wedge member to the spring means, the planes of movement of said wedge member relative to the first telescoping member and the inclined member being inclined relative to the frictional damping surface such that the frictional damping forces generated by relative movement of the telescoping elements in one direction exceeds the forces generated by movement in the other direction.

15. The suspension system of claim 14 wherein the spring means comprises a plurality of elastomeric spring elements in axial alignment and stabilizer means for maintaining the axial alignment of said springs.

16. The spring suspension system according to claim 1 wherein said frictional damping means includes a frictional damping element and means to move the said element into frictional damping engagement with a wear surface on said retaining means responsive to said second force component.

* * * * *